United States Patent [19]

Dally

[11] Patent Number: 5,475,857
[45] Date of Patent: * Dec. 12, 1995

[54] EXPRESS CHANNELS FOR DIMINISHING LATENCY AND INCREASING THROUGHPUT IN AN INTERCONNECTION NETWORK

[75] Inventor: William J. Dally, Framingham, Mass.

[73] Assignee: Massachusetts Institute of Technology, Cambridge, Mass.

[*] Notice: The portion of the term of this patent subsequent to Nov. 22, 2011, has been disclaimed.

[21] Appl. No.: 342,447

[22] Filed: Nov. 18, 1994

Related U.S. Application Data

[63] Continuation of Ser. No. 590,367, Sep. 28, 1990, Pat. No. 5,367,642.

[51] Int. Cl.$^6$ .............................. G06F 13/00; G06F 15/16
[52] U.S. Cl. .......................... 395/800; 395/280; 395/281; 395/306
[58] Field of Search ...................... 395/325, 800

[56] References Cited

U.S. PATENT DOCUMENTS

| | | | |
|---|---|---|---|
| 4,354,267 | 10/1982 | Mori et al. ............................ | 371/11 |
| 4,514,980 | 3/1989 | Peterson et al. ...................... | 395/200 |
| 4,809,202 | 2/1989 | Wolfram .............................. | 364/578 |
| 4,827,403 | 5/1989 | Steele et al. ........................ | 395/800 |
| 4,952,930 | 8/1990 | Franaszek et al. .................. | 340/825.02 |
| 4,958,400 | 7/1986 | Hillis ................................... | 370/60 |
| 5,043,874 | 8/1991 | Gagliardo et al. .................... | 395/425 |
| 5,048,011 | 9/1991 | Melen .................................... | 370/60 |
| 5,113,523 | 5/1992 | Colley et al. ........................ | 395/800 |
| 5,133,073 | 7/1992 | Jackson et al. ...................... | 395/800 |
| 5,134,690 | 7/1992 | Samatham ............................ | 395/200 |
| 5,157,785 | 10/1992 | Jackson et al. ...................... | 395/800 |
| 5,170,482 | 12/1992 | Shu et al. ............................ | 395/800 |

OTHER PUBLICATIONS

Hennessy and Patterson, "The Major Hurdle of Pipelining–Pipeline Hazards," Computer Architecture a Quantitative Approach, pp. 260–263 (1990).

Lafiti and El–Amawy, "On Folded Hypercubes," 1989 Conference on Parallel Processing, pp. I–180 to I–187.

*Primary Examiner*—Jack B. Harvey
*Assistant Examiner*—Jeffrey K. Seto
*Attorney, Agent, or Firm*—Hamilton, Brook, Smith & Reynolds

[57] ABSTRACT

An interconnection network is embellished with express channels that serve as parallel alternative paths to local channels between non-local nodes of the network. The use of the express channels increases throughput and diminishes latency experienced by the network. A single express channel may be used for a given sequence of nodes or alternatively multiple express channels may be utilized. Furthermore, express channels may be oriented in more than one dimension. Interchanges act as routing interfaces between the express channels and the conventional channels. The interchanges may be used as interfaces that adjust the wire density signalling level and speed at the boundaries of modules.

19 Claims, 6 Drawing Sheets

1

EXPRESS CHANNELS FOR DIMINISHING LATENCY AND INCREASING THROUGHPUT IN AN INTERCONNECTION NETWORK

GOVERNMENT SUPPORT

This invention was made with government support under contract Numbers DARPA N0014-88K-0738 and DARPA N00014-87K-0825, awarded by the Department of Defense. The government has certain rights in the invention.

RELATED APPLICATION

This application is a continuation of co-pending application Ser. No. 07/590,367 filed Sep. 28, 1990, now U.S. Pat. No. 5,367,642, which is incorporated herein by reference in its entirety.

RELATED PUBLICATIONS

Dally, William J. "Express Cubes: Improving the Performance of K-ary N-cube Interconnection Networks" VLSI Memorandum 89-564, Massachusetts Institute of Technology, Laboratory for Computer Science, October 1989, which is incorporated herein by reference.

BACKGROUND OF THE INVENTION

An interconnection network serves as a pathway for messages to travel amongst nodes of a data processing system. The messages that are sent over the interconnection network often include both data and synchronization information. The nodes of the interconnection network are typically data processing elements such as memory units or processing units. Such nodes may assume either one of two roles with respect to messages. First, they may act as switches that direct messages to their destinations. Second, they may act as message originators that originate messages which are forwarded to other nodes.

Interconnection networks are generally classified by topology, routing and flow control. The topology of an interconnection network concerns the physical arrangement of its nodes and channels into a graph. The routing strategy of an interconnection network, in contrast, refers to the strategy for creating paths in the network having a given topology. Lastly, flow control relates to the allocation of channel and buffer resources as messages travel along the paths of the interconnection network.

A topology of interconnection networks that has proven especially promising is the k-ary n-cube. A k-ary n-cube is an interconnection network that has k nodes in each of its n dimensions. An example of a k-ary n-cube is a 4×4 grid of nodes wherein each node is coupled to its immediately adjacent neighbors. Such a grid constitutes a 4-ary 2-cube because there are 4 nodes in each of the 2 dimensions. The k in the term "k-ary" is known as the radix. An extreme example of a k-ary n-cube is a hypercube.

Latency and throughput serve as useful benchmarks for measuring performance of an interconnection network. The latency of a message is the elapsed time from when a message send is initiated until the message is completely received. The latency of an interconnection network is the average message latency for a given set of specified conditions. Network latency can be broken down into several components. In particular, network latency is comprised of the latency attributable to nodes of the interconnection network, the latency attributable to the wires and the latency attributable to the message length. Network throughput, on the other hand, is the number of messages a network can deliver per a unit of time.

SUMMARY OF THE INVENTION

The present invention provides a class of interconnection networks that do not suffer from the significant drawbacks typically suffered by networks such as low degree (i.e. n=2 or n=3) k-ary n-cubes. Specifically, the present invention provides a class of interconnection networks with better throughput and diminished latency relative to low degree k-ary n-cubes. These benefits are realized by employing alternative parallel channels known as express channels in an interconnection network.

The interconnection network of the present invention is comprised of an array of nodes. Each node in the array is capable of routing messages. Local channels connect the immediately adjacent nodes to each other such that, for a message to travel from a node to another node, the message must travel through local channels and through intermediate nodes interconnected by local channels between the nodes. The local channels may be realized as duplex pairs of unidirectional channels having a separate unidirectional channel for carrying messages to a given node as well as a separate unidirectional channel for carrying messages from the given node. Also included in the network of the present invention is an express channel that runs in parallel with the conventional channels to provide an alternative message path between the first node and the second node. The express channel is a path between a pair of interchanges that bypasses the nodes interconnected between the first node and the second node. As such, messages travelling on the express channel do not incur the latency attributable to the nodes positioned between the first node and the second node. Lastly, the interconnection network additionally includes interchanges for interfacing the local channels with the express channel so that messages may travel over either the local channel or the express channel. Such an interconnection network is particularly well suited for a k-ary n-cube topology.

In the simplest embodiment, only a single express channel is used for any given row of an interconnection network. However, the use of additional express channels as discussed below is generally preferred. The nodes of the interconnection network may comprise processing elements as well as memory elements. These processing elements may include memory. It is preferred that the interchanges are situated periodically throughout the interconnection network.

As mentioned above, multiple express channels may be utilized. A hierarchical interchange organization is well suited for use with multiple express channels. In one hierarchical interchange organization, a first interchange interfaces a first of the express channels with the local channels, and a second interchange interfaces the second of the express channels with the local channels. Other hierarchical interchange configurations include more than two levels of express channels. Further, additional interchanges may be included to interface the multiple express channels with each other. In accordance with one embodiment, the hierarchical interchanges are positioned in stepwise fashion so that a message may ascend to a top level express channel and then descend back down to a bottom local channel level in such a manner as to maximize efficiency. The benefit of a hierarchical organization is that the distance component of latency only increases logarithmically with increasing distance. Still further, the express channels may be provided in multiple dimensions. For instance, express channels may be provided for linear arrays of nodes oriented in each of the multiple dimensions.

The interchanges may also be utilized as module interfaces in a data processing system. A module constitutes a physical component in a data processing hierarchy such as a chip, a circuit board, a chassis or a cabinet. When the interchanges are used as such, a first module has an interchange positioned near its module boundary. The interchange acts as an interface with a second interchange positioned within a second module. The two interchanges create an interface between the first and second modules. The interchanges serve additional purposes other than solely that of interfacing modules. For instance, the interchanges may be used to alter wire densities at module boundaries. Moreover, the interchanges may be used to alter the signalling levels at the module boundaries. Lastly, the interchange may be used to alter the rate of message transmission at the module boundaries.

DETAILED DESCRIPTION OF THE PREFERRED EMBODIMENT

Figure 1:
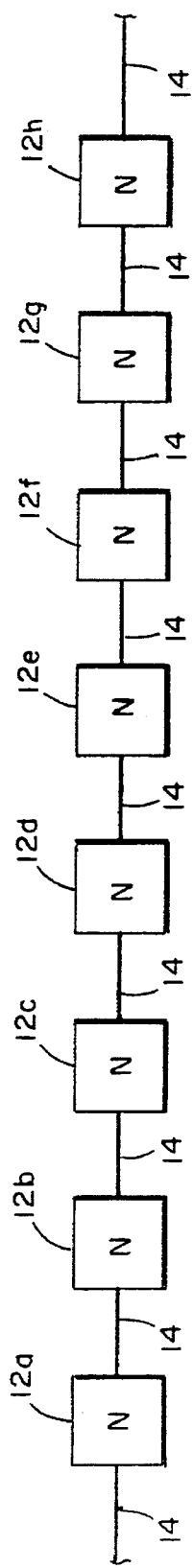
FIG. 1 illustrates a prior art linear array of nodes interconnected by conventional channels.

The present invention provides a means for diminishing latency and increasing throughput in interconnection networks. The present invention is particularly well suited for k-ary n-cube interconnection networks. As such, the preferred embodiment will be described with reference to a k-ary n-cube network. It, nevertheless, should be appreciated that the present invention is not limited to a k-ary n-cube topology; rather it also embodies many other topologies of interconnection networks.

Low dimensional k-ary n-cube interconnection networks (i.e. these having a small value of n), like many of their network counterparts, suffer two significant shortcomings. First, they have node delays that dominate their wire delays. In other words, for any message sent from a starting node to a destination node, the total delay the message experiences in travelling from the starting node to the destination node is due primarily to delays incurred by travelling through intermediate nodes situated between the starting node and the destination node as opposed to delays incurred by travelling over wire channels. One reason that node latency dominates wire latency is that the delay incurred per node is significantly larger than the delay incurred per unit length of wire. The major cause of large node latency, however, is that messages have to travel through several intermediate nodes to reach their destination node. Wire latency, however, is small because wire lengths are quite short, since wires only interconnect adjacent nodes. As a result of the node latency, the latency experienced with such networks is far greater than the theoretical optimum.

A theoretical limit to diminishing latency is that messages may not travel at a rate greater than the speed of light. Thus, a message may not travel a given distance in a shorter period of time than the time it would take for light to travel the same distance. Hence, an ideal network would transfer messages at close to the speed of light. Unfortunately, low dimensional (i.e. n=2 or n=3) k-ary n-cube interconnection networks have a distance related component of latency that generally falls far below this theoretical limit. In fact, the distance related component of latency for such networks falls more than an order of magnitude below the speed of light limitation.

The second shortcoming often suffered by low dimensional k-ary n-cube interconnection networks is that their channel width is often limited by node pin count rather than by wire density, i.e. the number of wires that can be routed through a unit of area. In theory, the channel width of such networks should be limited by the wire density, but, as a practical matter, it is the pin density and pin count that serve as the primary limitations of channel width. Most integrated circuit boards, have sufficient space available to enable the addition of more wires so as to increase wire density. The difficulty lies in that the available wire density on the boards cannot be exploited because of the pin limitations of the chips that the interconnection network interconnects. In fact, due to this limitation in the channels, most current configurations do not get saturated. As a result, maximum throughput is not realized in such networks.

The present invention is able to overcome these shortcomings by providing additional alternative parallel channels known as express channels that can be used for non-local messages (i.e. those destined beyond a given locality of nodes). These express channels are able to increase wire density within the restrictive framework created by the pin limitations. The channels are denoted as express channels because they act as express paths for non-local messages. These paths do not incur the high node latency cost associated with travelling from one node to the next node in a traditional k-ary n-cube. In this regard, the express channel acts analogously to an express train in that it does not make the additional train stops that typical trains have to make.

The ratio of node delay to wire delay and the ratio of pin density to wire density cannot generally be balanced in a traditional k-ary n-cube. However, if a k-ary n-cube is embellished with express channels, the wire length and wire density can be adjusted independently of the choice of radix (k), dimension (n) and channel width (W). Such an augmented k-ary n-cube will be referred to hereinafter as an express cube. In general, the wire length of the express channels can be increased to the point where the wire delays dominate the node delays so that the latency approaches closer to its optimal limit. Furthermore, the number of express channels can be adjusted to increase throughput until the available wiring media is saturated. This ability to balance node and wire limitations is achieved without sacrificing the wire efficiency of k-ary n-cube networks.

For purposes of illustrating the present invention it is helpful to look at the simplest k-ary n-cube: a k-ary 1-cube otherwise known as a linear array of nodes. FIG. 1 illustrates a portion of such a k-ary 1-cube 10. The linear array 10 is comprised of a sequence of nodes 12a–12h interconnected by local communication channels 14. For present purposes, it is assumed that each channel 14 is comprised of pairs of unidirectional channels. This pair is comprised of a unidirectional channel leading to a node and a unidirectional channel leading from the node. Each node 12a–12h is connected by the local channels 14 solely to its immediately adjacent neighbors. Hence, if a message originates from initiating node 12b which is destined for destination node 12e, the message must travel through the two intermediate nodes 12c and 12d situated between the initiating node 12a and the destination node 12e. As a result, a great deal of latency is added to the network because such messages necessarily incur the added node latency of the intermediate nodes 12c and 12d.

Messages may be broken into one or more packets for transmission across an interconnection network. A packet is the smallest unit that contains routing and sequencing information. Packets contain one or more flow control digits. These flow control digits are known as flits. Flits are used to control flow of messages through the network. Each flit, in turn, is composed of one or more physical transfer units or phits. In general, a phit is a sequence of W bits where W equals the number of bits that may be carried by the physical communication media over which messages travel (i.e. channel width).

Message latency is composed of three components. The first component is node latency. The node latency directly corresponds to the number of nodes traversed by a message times the delay incurred for each node. The second component of latency is the wire latency which refers to the time it takes for a message to travel a given distance of wire. The third and final component of latency is the message length. In particular, longer messages take longer to propagate from an initiating node to a destination node. The three components of latency can be expressed more formally in equation form as $$T_\alpha = HT_n + DT_w + (L/W)T_p$$

Where $T_\alpha$=latency of a message of length L sent a distance D;

H=number of nodes traversed by a message (referred to as hops);

$T_n$=latency of a node;

T=latency of a wire per unit distance;

W=width of a channel in bits; and $T_p$=pipeline period of a node.

Figure 2:
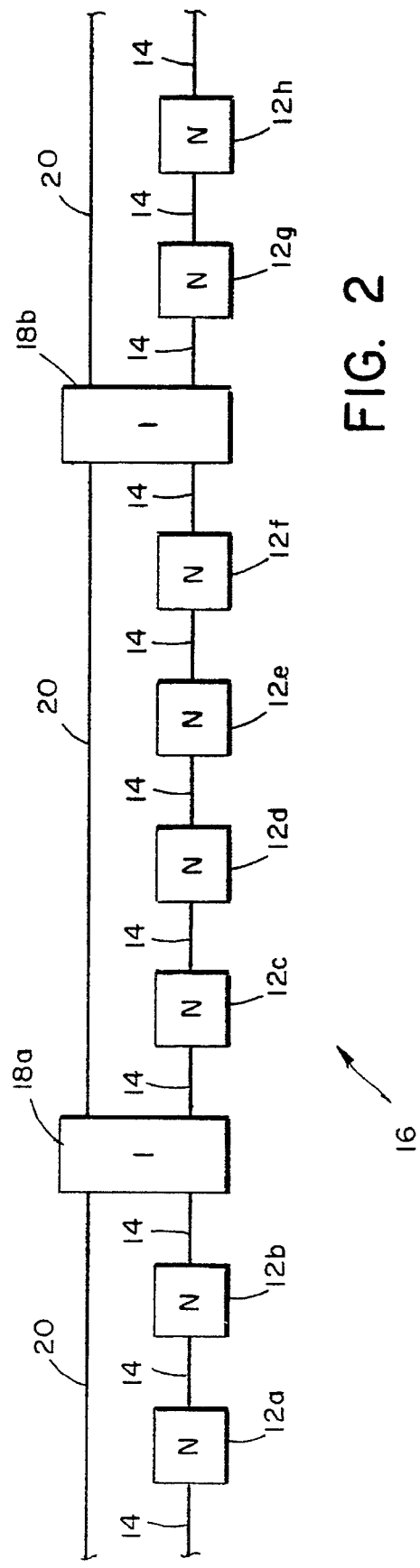
FIG. 2 illustrates an express cube configuration for a linear array of nodes.

The present invention overcomes the two described shortcomings by employing an express channel configuration such as shown in FIG. 2. The interconnection network 16 shown in FIG. 2 includes an express channel 20 and interchanges 18a and 18b. The inclusion of these additional components 18a, 18b and 20 enables the express cube 16 shown in FIG. 2 to reduce node latency by reducing the number of hops that a message must traverse When travelling between non-local nodes. The express channel 20 runs in parallel with the local channels 14 that interconnect nodes 12a–12h of the express cube 16. The interchanges 18a and 18b are not processing nodes; rather they perform only communication functions. As such, the interchanges 18a and 18b are not assigned an address. They serve primarily as routing interfaces between the local channels 14 and the express channel 20. The hardware of such interchanges 18a and 18b will be discussed below. It is preferred that such interchanges 18 be placed periodically throughout the express cube 16 to maximize their benefit.

To illustrate operation of the interchanges 18a and 18b, suppose that a message is being sent from node 12b to node 12g (FIG. 2). The message is initially sent from node 12b over a local channel 14 towards interchange 18a. When the message arrives at the interchange 18a, the message is routed directly to the next interchange 18b over the express channel 20. The receiving interchange 18b, then, routes the message over another local channel 14 to the destination node 12g. Such a message is deemed a non-local message because it is not destined to the locality of nodes 12c–12f situated between interchanges 18a and 18b. The advantage of using the express channel 20 in this instance is that the message does not incur the added node latencies that it would incur if it were forced to travel through all of the intervening nodes 12c–12f. Instead, the only node latency it incurs is that associated with the interchanges 18a and 18b. (It is assumed that the interchange latency is at most as great as the node latency). The remaining latency is the less significant wire latency.

Suppose, however, that the message being sent from node 12a is destined for a local node such as node 12e. In that case, when the message arrives at the interchange 18a, it is not forwarded along the express channel 20. It, instead, propagates along the successive local channels 14 interconnecting the nodes until it reaches the destination node 12e. In such instances, the message is routed as it would be routed in a conventional k-ary n-cube except that it passes through interchange 18a. In sum, the general rule of operation for an express cube is that a message arriving at an interchange is routed directly to the next interchange if it is not destined for one of the intervening local nodes. Otherwise, the message is routed along the local channels leading to the destination local node. So as to preserve the wire efficiency of the network (i.e. the efficiency in terms of number of wires required by the network), it is preferred that messages are never routed past their destination nodes on the express channels, even though such routing might reduce the number of hops a message would have to travel.

The latency of such express cubes like the latency for conventional k-ary n-cubes, can also be expressed as a mathematical equation. For purposes of this expression, it is assumed that the latency of an interchange equals that of a node (i.e. $T_n$), and it is also assumed that the throughput of an interchange is equal to that of a node (i.e. $1/T_p$). Further, the wire delay of the express channel is assumed to be $iT_w$ for interchanges situated every i nodes. Still further, it is assumed the interchanges add no physical distance to the network. Given these assumptions, the latency of an express cube is:

$$T_b = ((D/i)+i)T_n + DT_w + (L/W)T_p$$

where i|D; and $$H = D/i + i$$

More generally, an average message traversing D processing nodes travels over $H_f=(i+1)/2$ local channels to reach an interchange, $H_e=\lfloor D/i-1/2+1/(2i)\rfloor$ express channels to reach the last interchange before the destination, and finally $H_l=((D-i/2+1/2) \bmod i)$ local channels to the destination. The total number of hops is $H=H_f+H_e+H_l$, giving a latency of $$T_b=((i+1)/2+\lfloor D/i-1/2+1/2i\rfloor+((D-i/2+1/2)\bmod i))T_n+DT_w+LT_p/W.$$

A critical factor in reducing the latency is to properly select a value for i, where i is the frequency with which interchanges are placed in the express cube (i.e. the number of successive nodes between interchanges). For large values of D (i.e. when the messages are sent over large distances) choosing i to have a value of $\alpha$ strikes an excellent balance between node and wire delay, where $\alpha$ is the ratio of node latency $T_n$ to wire latency $T_w$. Specifically, when i is selected to be equal to $\alpha$, the latency due to distance is approximately twice the wire latency. Such a choice of i insures that node latency will not dominate wire latency as in conventional low dimensional k-ary n-cube networks. The latency for large distances of large express channel networks (where i=$\alpha$) is within a factor of two of the latency of a dedicated wire travelling the Manhattan distance (distance travelling non-diagonally in only horizontal and vertical steps) between source and destination. In contrast, for small distances (i.e. D is small) and for large $\alpha$, the i term in the coefficient of $T_n$ in the above equation for $T_b$ is significant. This indicates that node delay dominates the latency. For such networks the choice of i equal to the D minimizes latency. In particular, the latency due to distance approximates $2(D-1)T_n$.

Ideally, the throughput of an interconnection network should be limited by its wire density. Experience indicates, however, that throughput for a conventional system is, instead, dictated by pin limitations of chips in the network because current technology does not facilitate the production of enough pins to match the best potential wire density. If more wires are available to transmit data across the network, the throughput will be increased provided that routing and flow control strategies are able to properly schedule traffic onto these wires. Multiple express channels offer such an option. Specifically, multiple express channels exploit the additional area available on most circuit boards to boost wire density by providing additional alternate channels over which messages may travel. The resulting heightened wire density may be readily scheduled with additional traffic without suffering from the bottlenecks of pinout constraints. Hence, multiple express channels are an effective method of increasing throughput in networks where the channel width is typically limited by pinout constraints. The multiple express channels offset the load imbalance between express and local channels to allow network traffic to be more uniformly distributed.

Figure 3A:
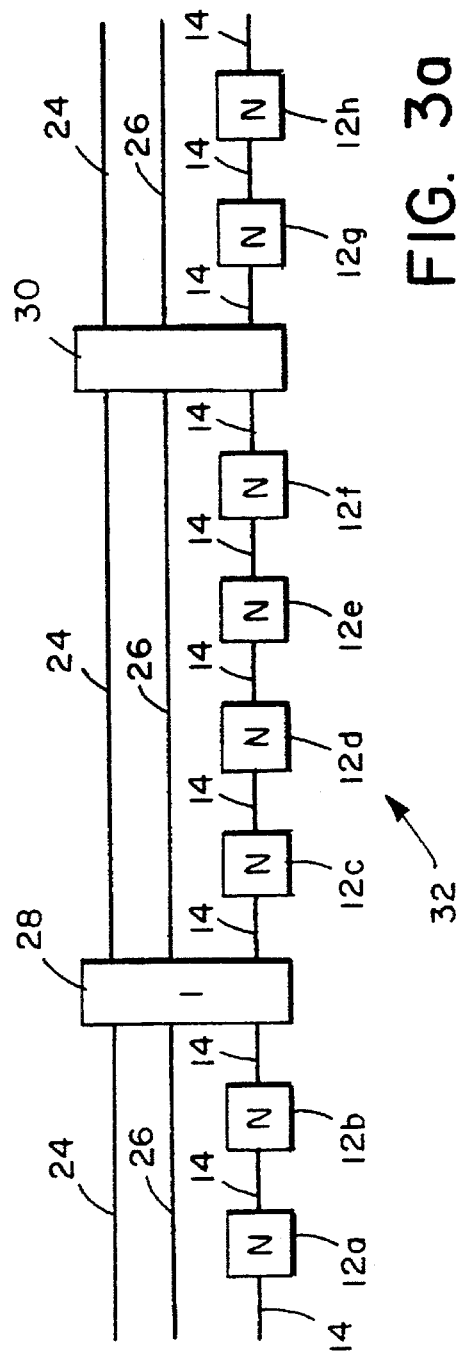
FIGS. 3a and 3b illustrate express cube configurations having multiple express channels.
Figure 3B:
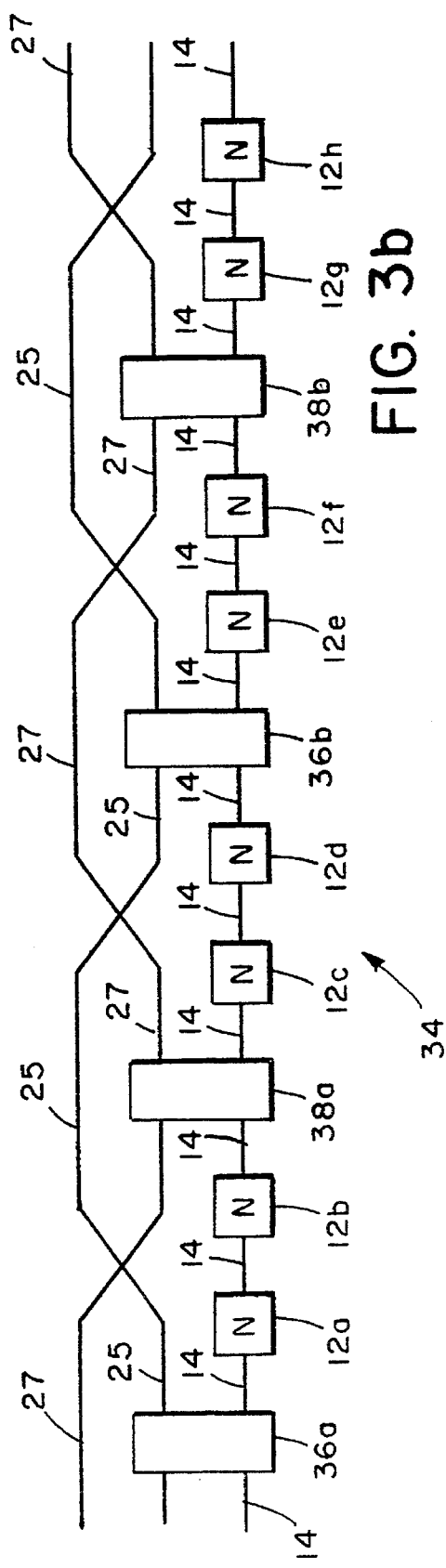

FIGS. 3a and 3b illustrate examples of how multiple express channels may be integrated into an express cube interconnection network. In FIG. 3a, multiple channel interchanges 28 and 30 are used. The interchanges 28 and 30 are inserted every i nodes such as described previously with reference to FIG. 2. Further, each interchange 28, 30 is connected to its neighbors using multiple parallel express channels 24 and 26. Although FIG. 3a depicts an express cube 32 having only two express channels 24 and 26, it should, nevertheless, be appreciated that larger numbers of express channels may be utilized. The interchanges 28 and 30 can be viewed as acting as concentrators that combine the messages arriving on the express channels 24 and 26 with non-local messages arriving on the local channels 14 to concentrate the messages into outgoing message streams on the express channels 24 and 26.

Alternatively, multiple express channels may be implemented by interleaving simplex interchanges such as shown in the configuration 34 of FIG. 3b. In accordance with this approach, simplex interchanges 36a, 36b, 38a and 38b are inserted into each group of i nodes. Each interchange 36a, 36b, 38a and 38b is connected to the corresponding interchange in the next group of i nodes by a single express channel 25 and 27, respectively. All messages from the nodes immediately before an interchange 36a, 36b, 38a and 38b are routed on the express channel 25, 27 associated with the interchange. Hence, a message originating from node 12b that is destined for node 12g is routed through interchange 38a over express channel 27 to interchange 38b and onto node 12g.

The interchanges may also be organized in a hierarchical fashion for multiple express channels. The hierarchical organization overcomes some of the limitations of use of a single express channel. Specifically, for a single level of express channels, an average of i local channels are traversed by each non-local message. The node delay incurred by travelling along these local channels represents a significant component of latency and causes networks with short distances (i.e. $D \leq \alpha^2$) to be node limited. Hierarchical express cubes overcome this problem by using several levels of express channels so that the node delay increases only logarithmically with distance for short distances.

Figure 4:
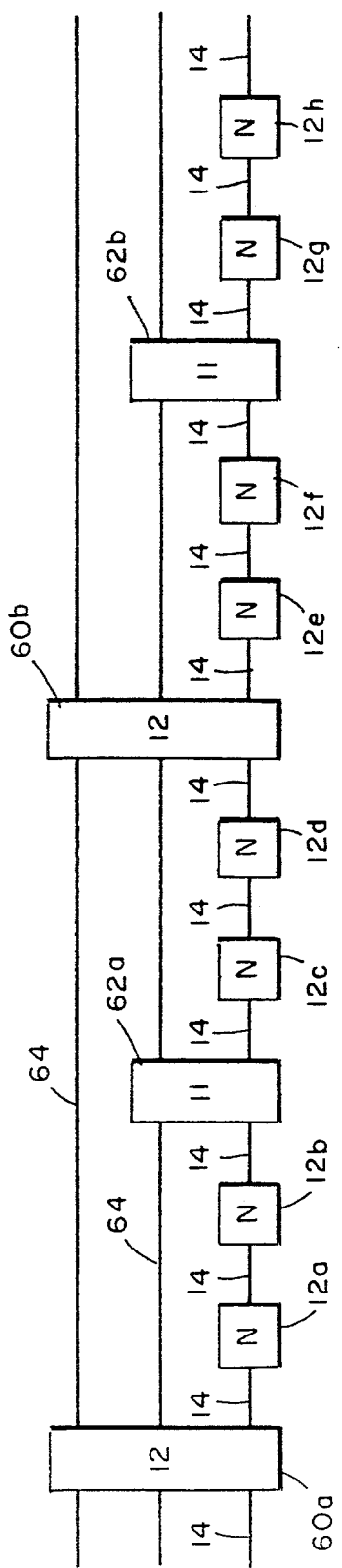
FIG. 4 shows an express cube organized in hierarchical fashion.

With hierarchical express channels there are several levels of interchanges. Specifically, a first level interchange is inserted every i nodes. Next, a second level interchange then replaces every ith first level interchange every $i^2$ nodes. In general, a jth level interchange replaces every ith j-1 level interchange every $i^j$ nodes. FIG. 4 illustrates an example hierarchical express cube for i=2 and L=2 (L denotes the number of express channels). Thus, interchanges 60a and 60b are inserted every 4 nodes replacing the interchanges 62a and 62b that would otherwise be inserted every 2 nodes. The interchanges 62a and 62b interface the express channel 66 with the local channels 14, whereas the interchanges 60a and 60b interface the express channels 64 and 66 as well as the local channels 14.

In a hierarchical express cube such as the one described with reference to FIG. 4, the jth level interchange has j+1 inputs and j+1 outputs. Thus, for the example shown in FIG. 4, the level 2 interchanges 60a and 60b have 3 inputs and 3 outputs. Messages that arrive are treated identically regardless of the input channel on which they arrive. The messages that are destined for one of the next i nodes that follow the interchange are routed to the local level zero output (i.e. over the local channels 14). The remaining messages that are destined for one of the next $i^2$ nodes are routed to the first level output. For the example in FIG. 4, a message originating from node 12b and destined for node 12e travels first to interchange 62a where it is placed on express channel 66. It then travels to interchange 60b which directs it to local channel 14; whereupon, it travels to node 12e.

Suppose, however, that the message originated from a node (not shown) situated before node 12a and was destined for node 12g. In that instance, the message would reach interchange 60a where it is passed via express channel 64 to interchange 60b. At interchange 60b, the message switches to express channel 66. The message then travels over express channel 66 to interchange 62b. Upon arriving at interchange 62b, the message is switched to local channel 14 where it travels to destination node 12g.

This process of routing continues with all messages in such a fashion until they have all been successfully routed. More formally, the process continues with all messages having a destination between $i^p$ and $i^{p+1}$ nodes away where $0 \leq p \leq j-1$, which are routed to the pth output. All remaining messages are routed to the jth output.

In general, a message in a hierarchical express cube is delivered in three phases: ascent, cruise, and descent. In the ascent stage, the message ascends to the highest level of express channel on which it will be travelling. For the ascent phase, an average message travels (i+1)/2 hops to get to a first interchange, and (i−1)/2 hops at each successive level for a total of $H_a = (i-1)L/2+1$ hops and a distance of $D_a = (i^L-1)/2$. During the cruise phase, a message travels along the highest level express channel to which it has ascended. In this phase, a message travels $H_c = (D-D_a)/i^L$ hops on level L channels for a distance of $D_c = i^L H_c$. Finally, the message descends back through the levels, continuing to travel on a level, j, as long as the remaining distance is greater than $i^j$. This phase is the descent phase for the special case where $i^L|D$, the descending message takes $H_d = (i-1)L/2+1$ hops for a distance of $D_d = (i^L+1)/2$. This gives a latency of $$T_c = (D/i^L + (i-1)T_n + T_w D + LT_p)/W.$$

Choosing i and L so that $i^L = \alpha$ balances node and wire delay for large distances. With this choice, the delay due to local nodes is $(i-1)LT_n = (i-1)\log_i \alpha T_n$. Given that i is an integer greater than unity, this expression is minimized for i=2. Choosing i to be a power of two facilitates decoding of binary addresses in interchanges. Networks with i=4, i=8 or i−16 may be desirable under some circumstances.

In the general case where $i^L|D$, the latency of a hierarchical express cube is calculated by representing the source and destination coordinates as $h = \log_i k$-digit radix-i numbers: $S = s_{h-1}, \ldots, s_0$ and $D = d_{h-1}, \ldots, d_0$. It is assumed that S<D. During the ascent phase, a message routes from the source S along $s_{h-1}$ to 0 taking $H_\alpha$ hops where $H_\alpha$=the summation of ((i−$s_j$) mod i) as j goes from 0 to L−1 and covers a distance $D_\alpha$, where $D_\alpha$=the summation of ((i−$s_j$) mod i)$i^j$, as j goes from 0 to L−1. Next, during the cruise phase, the message travels $H_c$ hops where $H_c$=the summation of $(d_j - s_j) i^{j-1}$ as j goes from L to h−1 and covers a distance of $D_c = H_c i^L$. Lastly, in the descent phase, the message travels from $d_{h-1}$ to $d_0$ to arrive at the destination taking $H_d$ hops, where $H_d$=the summation of $d_j$, as j goes from 0 to L−1 to cover a distance of $D_d$=the summation of $d_j i^j$ as j goes from 0 to L−1. It should be noted that for messages travelling short distances, the cruise phase will never be reached. The message moves directly from the ascent phase to the descent phase as soon as it reaches a node where all non-zero coordinates agree with D.

Figure 5A:
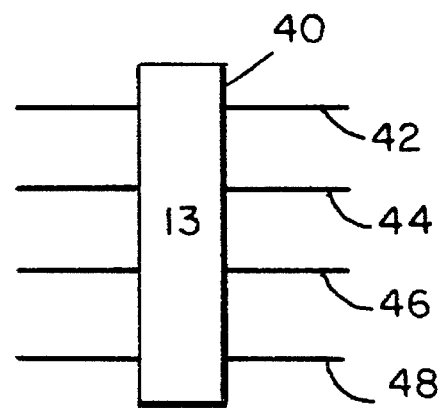
FIGS. 5a, 5b and 5c illustrate potential hierarchical interchange configurations.
Figure 5B:
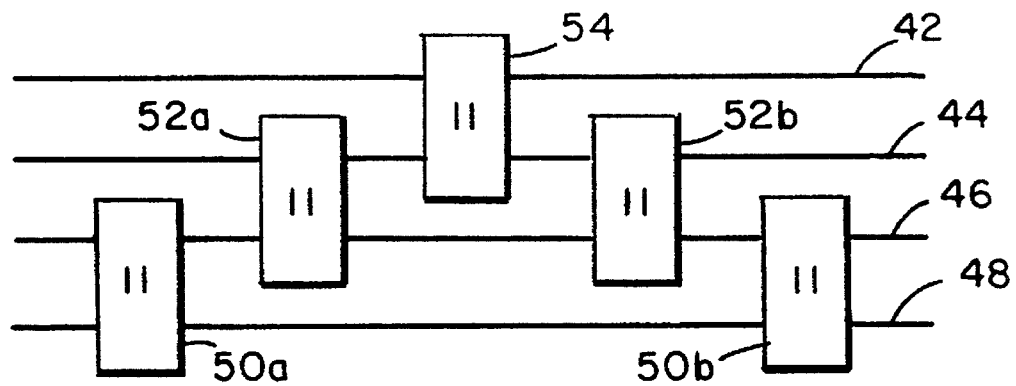

The physical embodiment of the hierarchical interchanges for a hierarchical express cube may take many forms. In general, a level j interchange requires j+1 inputs and j+1 outputs if implemented as a single module. For instance, as shown in FIG. 5a, a single pin bounded module 40 may be utilized to serve as an interchange among the four channels 42, 44, 46 and 48. Any level j interchange may, however, be decomposed into 2j−1 level one interchanges. The corresponding D composition of the interchange 40 of FIG. 5a (where j=2) is depicted in FIG. 5b. Specifically, a series of j−1 ascending interchanges 50a and 52a serve to route non-local traffic towards higher level express channels 42 and 44. These ascending interchanges 50a and 52a are followed by a single top level interchange 54 that serves as a routing interface with the highest level express channel 42. This highest level interchange 54 is, in turn, followed by a series of j−1 descending interchanges 52b and 50b. The descending interchanges 52b and 50b allow the local traffic to descend down to the lowest level local channel 48.

Figure 5C:
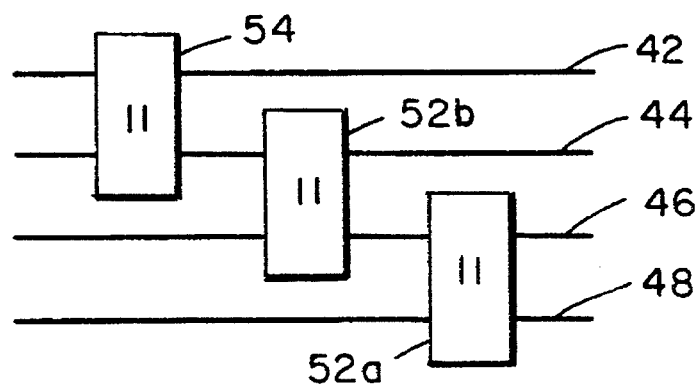

The decomposition of a single module into ascending and descending modules may be simplified by eliminating the ascending interchanges 50a and 52a. In the example case, a configuration such as shown in FIG. 5c is produced. This alternative configuration results in some degradation in performance but only to a limited extent. In particular, this alternative approach requires extra hops in some cases because a message cannot skip levels on its way up to a high level express channel. In general, each message must traverse at least one level j−1 channel before being switched to a level j channel.

Figure 6:
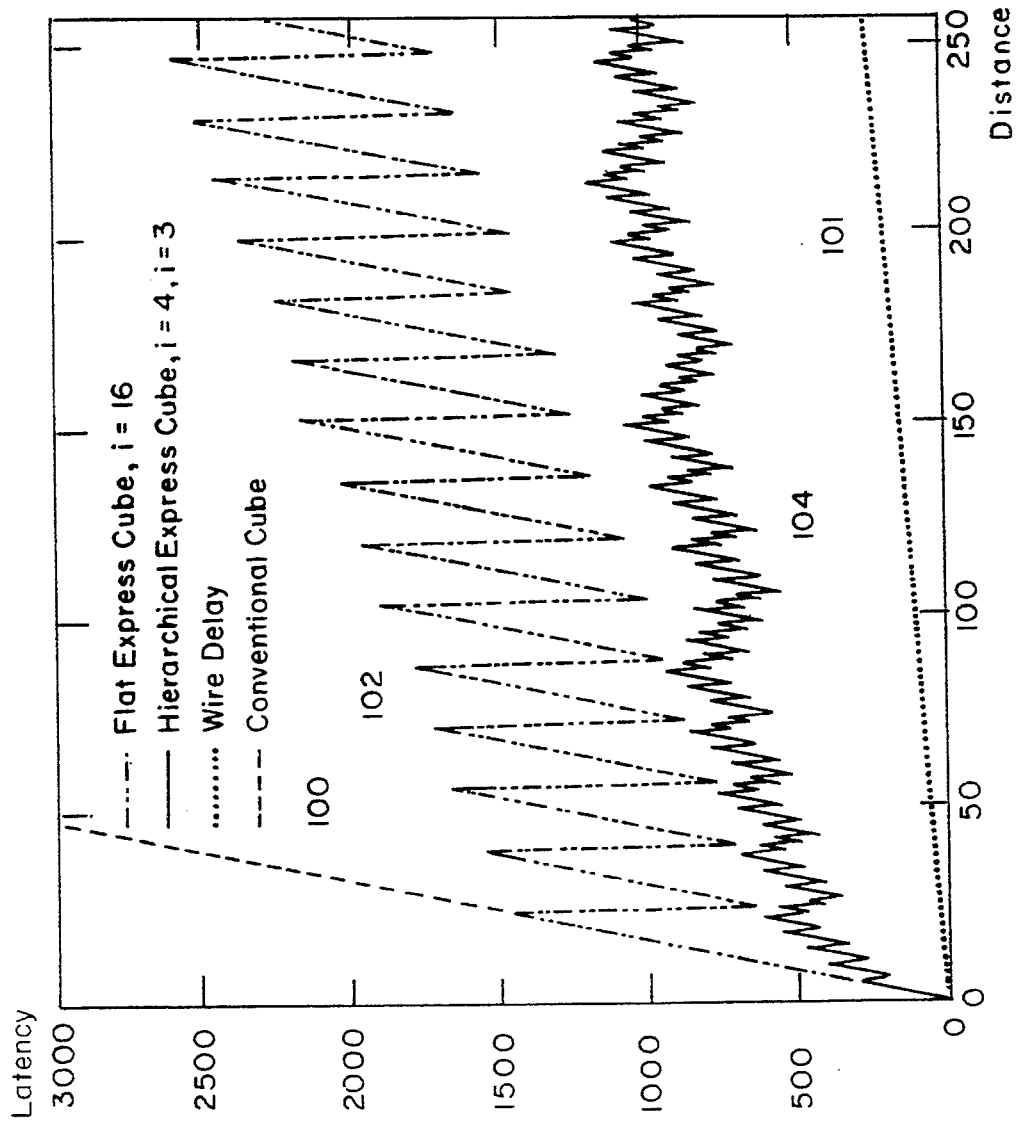
FIG. 6 is a plot of latency versus distance for several interconnection network alternatives.

The benefits of the use of standard express cubes or hierarchical express cubes relative to conventional k-ary n-cube can be illustrated graphically. For instance, FIG. 6 is a graph of distance versus latency for a number of alternative interconnection strategies: a flat (i.e. non-hierarchical) express cube with 16 levels (curve 102), a hierarchical express cube where L=4 having three levels (curve 104), a conventional k-ary n-cube (curve 100), and a straight plot of wire delay (curve 101). An examination of the graph in FIG. 6 leads to several general conclusions. First, the latency of a conventional k-ary 1-cube is linear and has a slope of α (see curve 100). Second, the latency of a straight wire has a slope of only 1 (see curve 101). Third, the performance of the flat express cube is significantly better than a conventional k-ary n-cube for large distances (compare curve 102 with curve 100). Fourth, the performance of the hierarchical express cube (curve 104) is generally even better than the flat express cube (curve 102).

The performance of the flat non-hierarchical express cube as expressed by the graph needs additional explanation. The flat express cube has the same delay as a conventional k-ary n-cube for short distances until a first express channel is reached by a message. Once the message begins travelling on express channels, the latency is significantly less than that of a conventional k-ary n-cube. Specifically, until the first express channel is reached, the delay equals $T_D$ where $T_D = \alpha D$. Once the message begins travelling on the express channel, the latency increases at the lower rate of 1+α/i. In general there is a periodic variation in delay due to the number of local channels being traversed. The local delay equals (i+1)/2+((D−i/2+1/2) mod i).

FIG. 6 also makes evident that the hierarchical express cube (curve 104) has even a more diminished latency than the flat express cube (curve 102). The latency is logarithmic for short distances and linear for long distances. The delay for short distances is within a factor of i−1 of the best that can be achieved with radix i switches. The long distance latency is approximately twice the latency of a dedicated Manhattan wire. It should be noted that for the hierarchical networks the interchange spacing (i.e. i) can be made small to provide good performance for short distances without comprising the delay of long distances messages. Unfortunately, with flat express cubes it is not possible to simultaneouly optimize performance for both short and long distances.

Thus far, the discussion of express channels has focused on express channels and interchanges oriented purely in one dimension. Express channels and interchanges may, however, be employed in multiple dimensions. For instance, as shown in FIG. 7a, interchanges 60 may be inserted separately between nodes 12 in dual dimensions (i.e. X and Y directions). A similar construction may be realized for higher dimensions as well as for hierarchical networks. This approach helps to minimize pin count because each interchange 60 handles only a single dimension (i.e. it handles only messages travelling in one dimension). Moreover, this design is easy to package into modules because of the organization of the interchanges 60 into regular rows and columns.

Figure 7B:
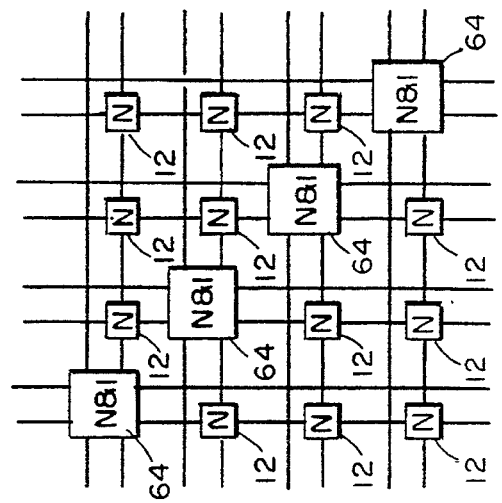
FIGS. 7a and 7b depict alternative embodiments of multidimensional express cubes.
Figure 7A:
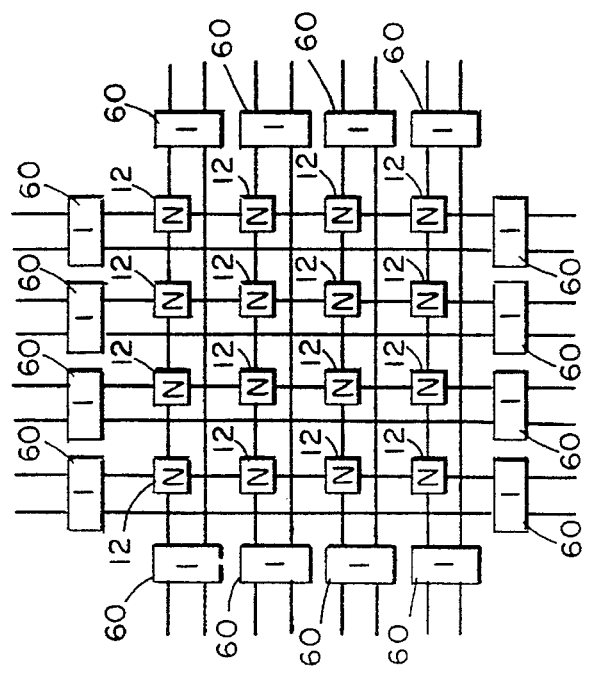

An alternative approach is to interleave multidimensional interchanges 64 into the array between nodes 12 as shown in FIG. 7b. In such an alternative approach, the interchanges 64 serve the role of both nodes and interchanges. They are able to interface multiple dimensions. The primary benefit of this approach is that it allows messages on express channels to change dimensions without descending to a local channel.

Figure 8:
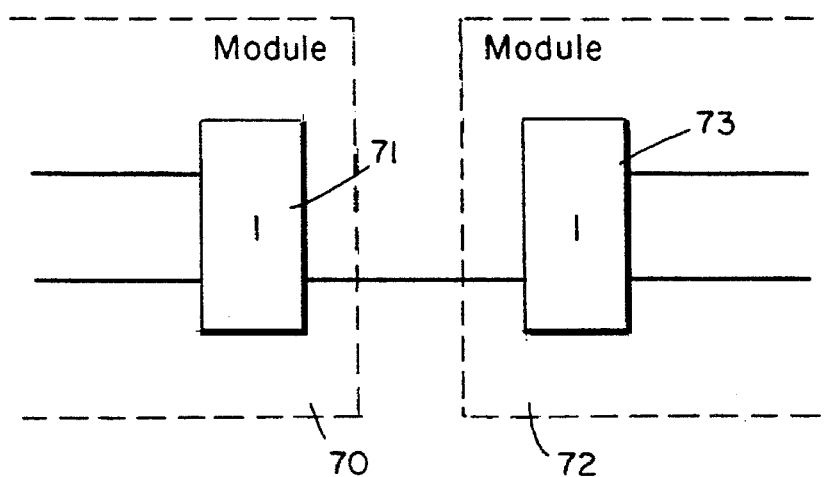
FIG. 8 shows a sample interface between adjacent circuit modules using interchanges.

The interchanges in an express cube may also be utilized to change wire density, transmission rate and signalling levels at module boundaries. An example of such a use is shown in FIG. 8 wherein interchanges 71 and 73 serve as an interface between modules 70 and 72.

To understand how this role of the interchanges may be useful, it is necessary to first understand how large interconnection networks are typically built. Such networks are typically built from many circuit modules organized into a physical hierarchy. A typical physical hierarchy includes integrated circuits, printed circuit boards, chassis and cabinets. The available wire density and bandwidth change significantly between the levels of this physical hierarchy. For example, a typical integrated circuit has a wire density of 250 wires per millimeter for a given layer, whereas a printed circuit board can handle only 2 wires per millimeter for a given layer. The interchanges such as 71 and 73 in FIG. 8 may be placed at the boundaries of module 70 and module 72 to vary the number and width of express and local channels. These boundary interchanges 71 and 73 may also be used to serve additional roles. Specifically, they may be used to convert internal module signalling levels, and they may also be used to adjust the speed at which messages travel. The primary role of such boundary interchanges 71 and 73 is to adjust the available wiring density so that it gets saturated with messages.

Figure 9:
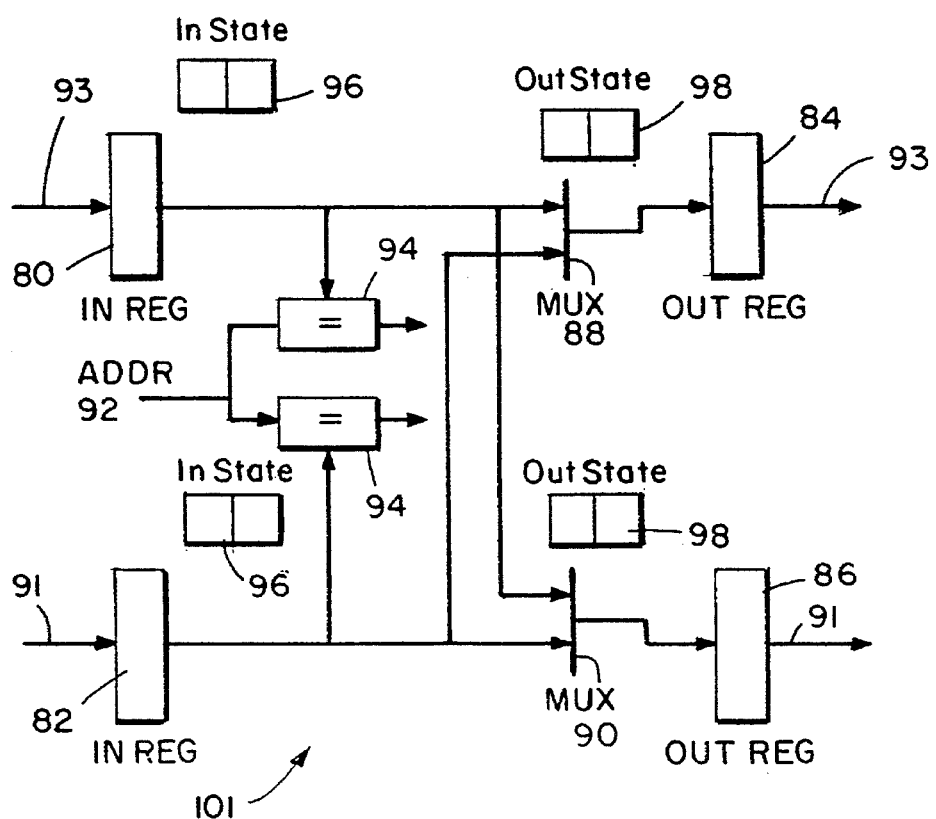
FIG. 9 shows a block diagram of the hardware of a unilateral interchange.

The interchanges utilized in express cubes may be constructed using traditional hardware. FIG. 9 shows a block diagram of a unidirectional interchange 101. To provide a bidirectional interchange, an identical circuit is constructed in the opposite direction of a single unidirectional interchange. The basic design of the interchange 101 is similar to that of a conventional router. In particular, two input registers 80 and 82 hold flits of incoming messages arriving on channels 91 and 93, respectively. Similarly, two output registers 84 and 86 hold flits of departing messages. Any of these registers 80, 82, 84 and 86 may be replaced with a buffer such as a FIFO buffer if additional buffering is necessary. Associated with each output register 84, 86 is a corresponding multiplexer 88 and 90, respectively. The multiplexers 88 and 90 select which input is routed to the output registers 84 and 86, respectively.

Routing decisions are made by comparing the address information 92 in the head flit of a given message designating the destination address with the local address specifying which nodes are local to the interchange 101. If the destination address lies within the next i nodes, the local channel 91 is selected. Otherwise, the express channel 93 is chosen. The results of the comparison by comparators 94 act as select inputs to the multiplexers 88 and 90 to insure proper selection of the channel 91 or 93.

State vectors 96 and 98 are kept for each of the registers 80, 82, 84 and 86. The state vectors 96 and 98 include presence bits indicating the presence of a valid message in the respective register. The presence bits 96a are utilized for flit level flow control. In general, a flit is allowed to advance from an input register 80, 82 to an output register 84, 86 if the presence bit of its output register 84, 86 is clear or if the register is to be emptied in the same clock cycle. The state vectors 96 also hold input state bits that encode the destination port and status of the message currently using each input. Lastly, the state vectors 98 hold a bit to identify which input has been granted the output. The logic circuitry necessary to maintain these state vectors 96 and 98 and control the respective data paths is known in the prior art.

While the invention has been particularly shown and described with reference to preferred embodiments thereof, it will be understood by those skilled in the art that various changes in form and details may be made without departing from the spirit and scope of the invention as defined in appended claims.

I claim:

1. An interconnection network comprising:

a) an array of nodes interconnected by local channels such that any node may communicate with another node through local channels and through nodes of the array interconnected by the local channels;

b) an express channel running in parallel with the local channels to provide an alternative path for messages travelling between a first node and a second node that bypasses nodes interconnected by local channels between the first node and the second node; and c) interchanges for interfacing the local channels with the express channel so that messages may travel over either the local channels or the express channel.

2. An interconnection network as recited in claim 1 further comprising additional express channels for providing additional alternative paths.

3. An interconnection network as recited in claim 2 further comprising additional interchanges for interfacing the additional express channels with each other and with the local channels.

4. An interconnection network as recited in claim 1 wherein the array is a linear array of nodes.

5. An interconnection network as recited in claim 1 wherein the interchanges are situated periodically throughout the interconnection network.

6. An interconnection network as recited in claim 1 wherein the nodes comprise processing elements.

7. An interconnection network as recited in claim 1 wherein the nodes comprise memory elements.

8. An interconnection network, comprising:

a) a linear array of nodes;

b) local channels interconnecting immediately adjacent nodes to allow messages to pass between nodes such that for a message to travel between two non-adjacent nodes over local channels, the message travels through nodes innerconnected between the non-adjacent nodes;

c) express channels running in parallel to the local channels for providing alternative paths for messages to travel between nodes that bypass intermediate nodes interconnected between said nodes; and d) interchanges for interfacing the express channels and the local channels so as to allow messages to travel over either the express channels or the local channels.

9. An interconnection network as recited in claim 8 wherein the interchanges comprise a first interchange that interfaces a first of the express channels with the local channels and a second interchange that interface a second of the express channels with the local channels.

10. An interconnection network as recited in claim 8 wherein the interchanges comprise interchanges that interface multiple express channels with each other.

11. An interconnection network as recited in claim 10 wherein said interchanges also interface the express channels with the local channels.

12. An interconnection network as recited in claim 8 wherein the nodes comprise processing elements.

13. An interconnection network as recited in claim 8 wherein the nodes comprise memory elements.

14. In an interconnection network having a plurality of nodes interconnected by local channels, a method of decreasing message latency attributable to nodes, comprising the steps of:
 a) providing an express channel that runs in parallel with local channels but that bypasses nodes interconnected by local channels in a locality;
 b) providing interchanges positioned in the interconnection network to interface the local channels with the express channel;
 c) routing local messages destined to the locality of nodes positioned between interchanges over the local channels; and
 d) routing non-local messages destined to nodes positioned outside the locality of nodes over the express channel to decrease message latency attributable to the nodes.

15. A method as recited in claim 14 further comprising the step of providing additional express channels.

16. A method as recited in claim 15 further comprising the step of providing additional interchanges that interface the express channels.

17. A method as recited in claim 16 wherein the interchanges are organized in hierarchical fashion so that a message may consecutively step from level to level of express channels and local channels.

18. A method as recited in claim 16 wherein said additional express channels are oriented in multiple dimensions.

19. A method as recited in claim 18 wherein certain of the interchanges interface express channels oriented in different dimensions.

\* \* \* \* \*